United States Patent
Freedman

[15] 3,692,796
[45] Sept. 19, 1972

[54] 4H[1]BENZOPYRANO[3,4-D]ISOXAZOLE DERIVATIVES

[72] Inventor: Jules Freedman, Thiensville, Wis.

[73] Assignee: Colgate-Palmolive Company, New York, N.Y.

[22] Filed: Aug. 27, 1970

[21] Appl. No.: 67,603

Related U.S. Application Data

[63] Continuation-in-part of Ser. No. 670,772, Sept. 26, 1967, Pat. No. 3,553,228.

[52] U.S. Cl. .260/307 H, 260/247.2 A, 260/247.2 B, 260/247.5 B, 260/268 TR, 260/293.58, 260/345.2, 424/248, 424/250, 424/267, 424/272
[51] Int. Cl. .............................................C07d 85/22
[58] Field of Search.......260/307 H, 293.58, 268 TR, 260/247.1, 247.2 R, 247.2 A, 247.2 B

[56] References Cited

UNITED STATES PATENTS 3,553,228   1/1971   Freedman..................260/307

Primary Examiner—Alex Mazel
Assistant Examiner—R. V. Rush
Attorney—T. F. Kryshak and M. L. Youngs

[57] ABSTRACT

4H[1]benzopyrano[3,4-d]isoxazole derivatives substituted in the 3-position which are useful as pharmaceutical agents, especially anti-inflammatory agents. They are also useful in preparing structurally related pharmaceutical compounds of known utility. In addition, they are useful as intermediates in the preparation of wood preservatives, mothproofing agents and pickling inhibitors. Representative of the compounds disclosed are 4H[1]benzopyrano [3,4-d]isoxazole-3-carboxamide, ethyl 4H[1]benzopyrano[3,4-d]isoxazole-3-carboxylate and N-methyl-4H[1]benzopyrano[3,4-d]isoxazole-3-thiocarboxamide.

6 Claims, No Drawings

4H[1]BENZOPYRANO[3,4-D]ISOXAZOLE DERIVATIVES

RELATED CASE

This application is a continuation-in-part of my copending application Ser. No. 760,772 filed Sept. 26, 1967, now U.S. Pat. No. 3,553,228.

DETAILED DESCRIPTION

The compounds of the present invention may be represented by the following formula

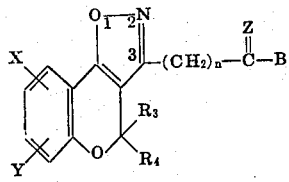

in which X and Y are the same or different members selected from hydrogen, halo such as chloro, bromo or fluoro, lower alkyl of one to four carbon atoms such as methyl, ethyl or propyl, a lower alkoxy of one to four carbon atoms such as methoxy, ethoxy or propoxy and trifluoromethyl, Z is O or S, $n$ is 0 to 3, B is selected from

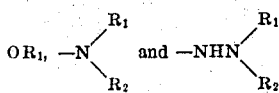

in which $R_1$ and $R_2$ are selected from hydrogen, a lower alkyl of one to four carbon atoms such as previously described, phenyl, a phenyl-lower alkyl of seven to 13 carbon atoms such as benzyl, phenethyl and phenylisopropyl, including nuclear-substituted phenyl lower alkyls such as p-chlorobenzyl or p-methoxybenzyl, and groups in which $R_1$ and $R_2$ in

are joined together to form a cyclicamino group selected from morpholine, pyrrolidino, piperidino 4-lower alkyl-1-piperazino such as 4-methyl-1-piperazine, N-phenyl-lower alkyl piperazino and N-hydroxy lower alkyl piperazino such as N-hydroxyethyl piperazino.

The compounds of the present invention may be conveniently prepared employing as the basic starting material a 4-chromanone of the formula

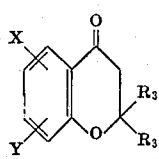

in which $R_3$, X and Y are as previously defined.

The unsubstituted 4-chromanone is a known compound and the substituted compounds may be prepared as described in the literature [C. D. Hurd, et al., *J. Am. Chem. Soc.*, 76, 5065 (1954) and S. Wawzonek, et al., *J. Am. Chem. Soc.*, 76, 1080 (1954)].

Representative of the 4-chromanones which may be employed as starting materials are
 4-chromanone,
 6-methoxy-4-chromanone,
 6-bromo-4-chromanone,
 8-methyl-4-chromanone,
 6-trifluoromethyl-4-chromanone,
 2,2-dimethyl-4-chromanone,
 6-chloro-4-chromanone,
 2-phenyl-4-chromanone,
 6-methyl-4-chromanone,
 6,7-methylenedioxy-4-chromanone, and
 6-chloro-2-phenyl-4-chromanone.

In the preferred method of preparation of the novel compounds, a 4-chromanone is treated with a lower alkyl oxalate such as ethyl oxalate, in the presence of a suitable base such as sodium amide, sodium methoxylate or sodium hydride, in an anhydrous reaction medium such as toluene or benzene, to form a lower alkyl 4-oxochroman-3-glyoxylate. The ring closure is then effected by treating the glyoxylate with hydroxylaminehydrochloride in ethanol under reflux conditions to form the lower alkyl 4H[1]benzopyrano[3,4-d]isoxazole-3-carboxylate.

The described process may be illustrated as follows:

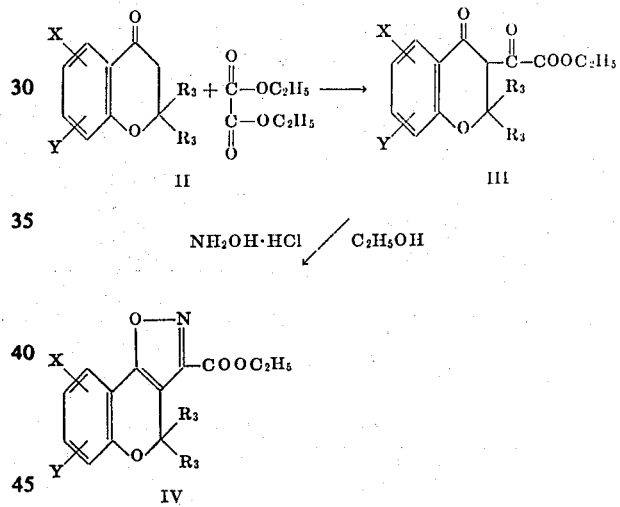

wherein $R_3$, X and Y are as previously defined and do not partake in or interfere with the reaction.

Representative of the compounds which may be prepared by the above processes are
 ethyl 4-oxochroman-3-glyoxylate,
 ethyl 4H[1]benzopyrano[3,4-d]isoxazole-3-carboxylate,
 ethyl 6-chloro-4-oxochroman-3-glyoxylate,
 ethyl 6-methoxy-4-oxyochroman-3-glyoxylate,
 methyl 7-methyl-4-oxochroman-3-glyoxylate,
 methyl 8-methoxy-4H[1]benzopyrano[3,4-d]isoxazole-3-carboxylate, and
 ethyl 8-chloro-4H[1]benzopyrano[3,4-d]isoxazole-3-carboxylate.

The lower alkyl 4H[1]benzopyrano[3,4-d]isoxazole-3-carboxylate (IV) may then be employed to prepare the corresponding amide, carboxhydrazide and carboxylic acid derivatives by application of conventional techniques which may be illustrated as follows:

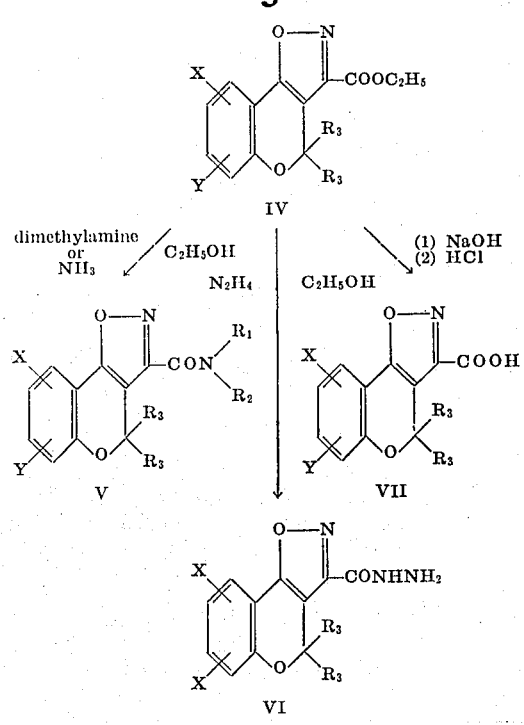

wherein $R_1$ and $R_2$ are both hydrogen or methyl, and $R_3$, X and Y are as previously defined and do not interfere with or partake in the reaction.

Representative of the compounds which may be prepared by the above processes are 4H[1]benzopyrano[-d]isoxazole-3-carboxamide,
N,N-dimethyl-4H[1]benzopyrano[-d]isoxazole-3-carboxamide,
N-methyl-7-methoxy-4H[1]benzopyrano[3,4-d]isoxazole-3-carboxamide,
N,N-dimethyl-8-trifluoromethyl-4H[1]benzopyrano[3,4-d]isoxazole-3-carboxamide,
N,N-dimethyl-8-chloro-4H[1]benzopyrano[3,4-d]isoxazole3-carboxamide,
N-isopropyl-4H[1]benzopyrano[-d]isoxazole-3-carboxamide,
N-methyl-8-chloro-4H[1]benzopyrano[3,4-d]isoxazole-3-carboxamide,
N-methyl-4H[1]benzopyrano[-d]isoxazole-3-carboxamide,
6-methoxy-4H[1benzopyrano[d3,4-d]isoxazole-3-carboxamide,
N-methyl-4H[1]benzopyrano[-d]isoxazole-3-carboxamide,
8-methoxy-4H[1]benzopyrano[3,4-d]isoxazole-3-carboxamide,
N-benzyl-4H[1   1benzopyrano[3,4-d]isoxazole-3-carboxamide,
3-pyrrolidinocarbonyl-8-chloro-4H[1]benzopyrano[3,4-d]isoxazole-3-carboxamide,
4H[1]benzopyrano[-]isoxazole-3-carboxhydrazide,
8-chloro-4H[1]benzopyrano[3,4-d]isoxazole-3-carboxhydrazide,
8-methyl-4H[1]benzopyrano[3,4-d]isoxazole-3-carboxhydrazide,
8-trifluoromethyl-4H[1]benzopyrano[3,4-d]isoxazole-3-carboxhydrazide,
7-methoxy-4H[1]benzopyrano[3,4-d]isoxazole-3-carboxhydrazide,
N-methyl-4H[1]benzopyrano[-d]benzopyrano[-d]isoxazole-3-carboxhydrazide,
4H[1]benzopyrano[-d]isoxazole-3-carboxylic acid, and
8-chloro-4H[1]benzopyrano[3,4-d]isoxazole-3-carboxylic acid.

The 4H[1]benzopyrano[3,4-d]isoxazole-3-carboxamides serve as convenient starting materials for the preparation of corresponding thiocarboxamides. In the preferred method, the carboxamide derivative is reacted with $P_2S_5$ in pyridine under reflux conditions.

The reaction may be illustrated as follows:

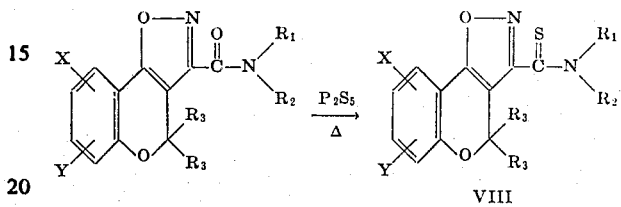

wherein all symbols are as previously described.

Representative of the compounds which may be prepared by the described process are 4H[1]benzopyrano[-d]isoxazole-3-thiocarboxamide,
N-methyl-4H[1]benzopyrano[-d]isoxazole-3-thiocarboxamide,
N,N-dimethyl-4H[1]benzopyrano[-d]isoxazole-3-thiocarboxamide,
N-methyl-7-methoxy-4H[1]benzopyrano[3,4-d]isoxazole-3-thiocarboxamide,
N,N-dimethyl-8-trifluoromethyl-4H[1]benzopyrano[3,4-d]isoxazole-3-thiocarboxamide,
N-isopropyl-4H[1]benzopyrano[-d]isoxazole-3-thiocarboxamide,
N-methyl-8-chloro-4H[1]benzopyrano[3,4-d]isoxazole-3-thiocarboxamide,
N,N-dimethyl-8-chloro-4H[1]benzopyrano[3,4-d]isoxazole-3-thiocarboxamide,
6-methoxy-4H[1]benzopyrano[3,4-d]isoxazole-3-thiocarboxamide, and
8-methoxy-4H[1]benzopyrano[3,4-d]isoxazole-3-thiocarboxamide.

The 4H[1]benzopyrano[3,4-d]isoxazole-3-carboxamides thus obtained may be converted to the corresponding nitrile by treatment with thionyl chloride in dimethylformamide.

The process may be illustrated as follows:

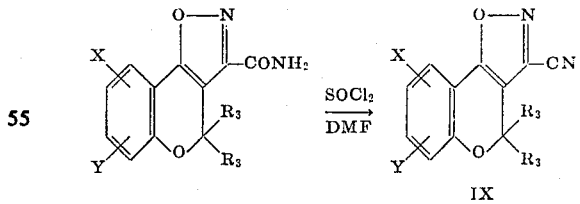

wherein $R_3$, X and Y are as previously defined and do not interfere with or partake in the reaction.

Representative of the compounds which may be prepared by the above process are:

4H[1]benzopyrano[-d]isoxazole-3-carbonitrile,
8-chloro-4H[1]benzopyrano[3,4-d]isoxazole-3-carbonitrile,
6-methoxy-4H[1]benzopyrano[3,4-d]isoxazole-3-carbonitrile, and 7-methyl-4H[1]benzopyrano[3,4-d]isoxazole-3-carbonitrile.

The nitrile (VIII) serves as a convenient starting material for the preparation of the corresponding carboxamidoxime, carboximidate or carboxamidine. For example, the nitrile may be treated with hydroxylamine in the presence of sodium methoxide to form the corresponding carboxamidoxime, or the nitrile may be treated with sodium methoxide in anhydrous methanol to form the carboximidate, or with ethanolic methylamine to form the corresponding carboxamidine.

These processes may be illustrated as follows:

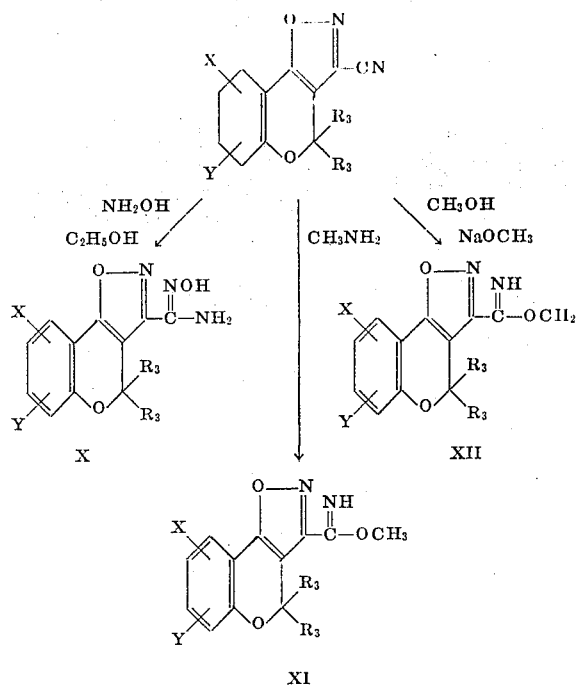

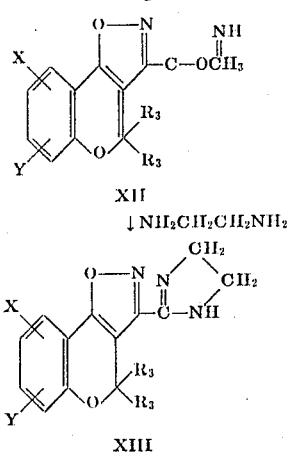

in which $R_3$, X and Y are as previously defined and do not interfere with or partake in the reactions.

Representative of the compounds which can be prepared by the above processes are 4H[1]benzopyrano[-d]isoxazole-3-carboxamidoxime,
6-chloro-4H[1]benzopyrano[3,4-d]isoxazole-3-carboxamidoxime,
7-methyl-4H[1]benzopyrano[3,4-d]isoxazole-3-carboxamidoxime,
8-methoxy-N-methyl-4H[1]benzopyrano[3,4-d]isoxazole-3-carboxamidine,
N-methyl-6-chloro-4H[1]benzopyrano[3,4-d]isoxazole-3-carboxamidine,
N-methyl-7-methoxy-4H[1]benzopyrano[3,4-d]isoxazole-3-carboxamidine,
methyl 4H[1]benzopyrano[3,4-d]isoxazole-3-carboximidate,
methyl 6-chloro-4H[1]benzopyrano[3,4-d]isoxazole-3-carboximidate,
methyl 7-methyl-4H[1]benzopyrano[3,4-d]isoxazole-3-carboximidate, and
methyl 8-methoxy-4H[1]benzopyrano[3,4-d]isoxazole-3-carboximidate.

The corresponding imidazolinyl derivative may be prepared from the carboximidate derivative by treating it with ethylene diamine in methanol under reflux conditions. The process may be illustrated as follows:

in which $R_3$, X and Y are as previously defined and do not interfere with or partake in the reactions.

Representative of the compounds which can be prepared by the above process are 3-(2-imidazolinyl)-4H[1]benzopyrano[3,4-d]isoxazole,
3-(2-imidazolinyl)-6-chloro-4H[1]benzopyrano[-d]isoxazole,
3-(2-imidazolinyl)-7-methyl-4H[1]benzopyrano[3,4-d] isoxazole,
3-(2imidazolinyl)-8-methoxy-4H[1]benzopyrano[3,4-d] isoxazole, and The compounds in which n is larger than 1 may be prepared by treating the esters with lithium aluminum hydride to form the corresponding alcohol. The alcohol is then treated with tosyl chloride in a suitable solvent such as pyridine to form the tosylate. The tosylate is then treated with sodium cyanide to form the next higher nitrile which can be used as a starting material in the previously described processes or esterified and employed to prepare the next higher derivatives. If desired, the tosylate may be treated with an amine to form the desired amine derivatives.

The described processes may be illustrated as follows:

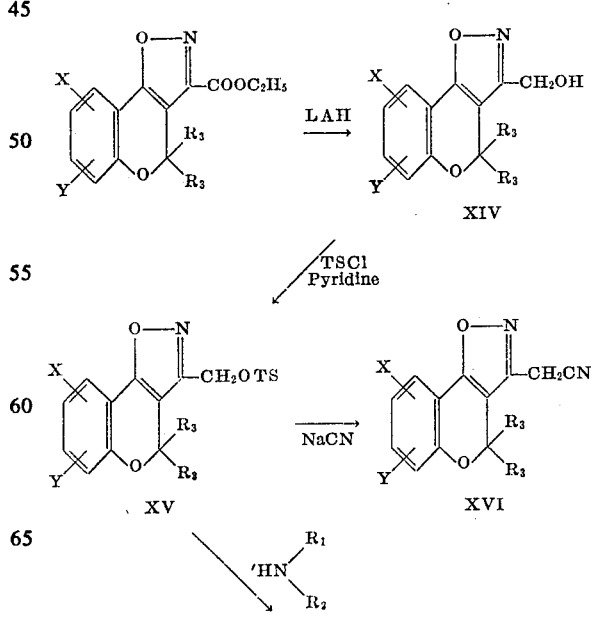

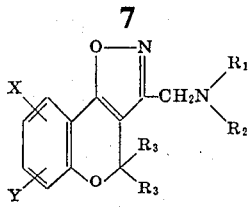

XVII in which all symbols are as previously described and do not partake in or interfere with the reaction.

Acid addition salts of the compounds of the present invention capable of forming such salts may be conveniently produced by contacting the compounds with a suitable acid such as formic acid, citric acid, maleic acid, sulfuric acid, hydrochloric acid, succinic acid, tartaric acid, benzoic acid or fumaric acid.

Quaternary ammonium salts may be formed by contacting the compounds capable of forming such salts with a suitable alkylating agent such as dimethyl sulfate, or an alkyl halide such as methyl chloride, methyl iodide or ethyl bromide.

The compounds of the present invention possess central nervous system depressant and anti-inflammatory activity. The compounds ethyl 4H[1]benzopyrano[3,4-d]isoxazole-3-carboxylate and 4H[1]benzopyrano[3,4-d]isoxazole-3-carboxamide have been shown at oral doses of 20 mg/kg b.i.d. to reduce the edema and inflammatory response which occurs when M. butyricum is injected into a rat to experimentally induce mycobacterial adjuvent arthritis. In evaluating the compounds, oral doses of 20 mg/kg were administered twice a day for four days beginning 11 days after the injection of a 0.5 percent suspension of M. butyricum in a light mineral oil base into the plantar surface of the right hind foot of the rat. The volume of each hind foot of the rat was determined by mercury displacement immediately following the injection and 11 and 15 days after the injection. In the animals which were treated with the compounds, the volume of the injected foot decreased substantially as compared to the controls indicating an anti-inflammatory action attributable to the compounds.

The compounds of the invention are also useful as intermediates in the preparation of structurally related pharmaceutical agents. In addition, the thiocyanic acid addition salts of the compounds of this invention, when condensed with formaldehyde, form resinuous materials useful as pickling agents according to U.S. Pat. Nos. 2,425,320 and 2,606,155. The compounds also form fluosilicic acid addition salts which are useful as mothproofing agents according to U.S. Pat. Nos. 1,915,334 and 2,075,359.

When intended for pharmaceutical use, the compounds are preferably combined with one or more suitable pharmaceutical diluents and additives and formed into unit dosage forms for oral or parenteral administration such as tablets, capsules and solutions.

The pharmaceutical diluents which may be employed may be either solids such as starch, talc or sugar, or liquids such as water or propylene glycol.

The unit dosage forms may contain a concentration of 0.1 to 10 percent or more by weight of one or more of the novel compounds. Generally, such dosage forms will contain about 5 to 150 mg. of the active ingredients.

The following examples are presented to illustrate this invention:

EXAMPLE 1

Ethyl 4-oxochroman-3-glyoxylate

A mixture of 74 g. (0.5 mole) of 4-chromanone and 146 g. (1.0 mole) of ethyl oxalate in 375 ml. of anhydrous toluene is added dropwise over 1.25 hours to a suspension of sodium hydride (from 54.4 g. of a 53.3 percent oil-hydride mixture) in 1 liter of anhydrous toluene under an atmosphere of nitrogen. After stirring at room temperature overnight the reaction mixture is added to 1 kg. of ice and stirred 1 hour. The aqueous layer is separated and the organic phase extracted with five 250 ml. portions of $H_2O$. Acidification of the combined extracts with 75 ml. of concentrated hydrochloric acid gives a precipitate of 115.6 g. (94 percent of bright yellow solid. Recrystallization from 200 ml. of ethanol gives the ethyl 4-oxochroman-3-glyoxylate, m.p. 72°–79°.

Anal. Calcd. for $C_{13}H_{12}O_5$: C, 62.90; H, 4.87.

Found: C, 62.68; H, 5.03.

EXAMPLE 2

Ethyl 4H[1]benzopyrano[3,4-d]isoxazole-3-carboxylate

A mixture of 99.2 g. (0.4 mole) of ethyl 4-oxochroman-3-glyoxylate, 29.6 g. (0.425 mole) of hydroxylaminehydro-chloride and 800 ml. of ethanol are refluxed for 18 hours, 200 ml. of solvent distilled and the residue cooled to give the isoxazole, m.p. 88°–92. Recrystallization from cyclohexane provides 1pure ester, ethyl 4H[1]benzopyrano[3,4-d]isoxazole-3-carboxylate, m.p. 90°–92°.

Anal. Calcd. for $C_{13}H_{11}NO_4$: C, 63.68; H, 4.53; N, 5.71.

Found: C, 63.92; H, 4.67; N, 5.56.

EXAMPLE 3

4H[1]Benzopyrano[3,4-d]isoxazole-3-carboxylic acid

A solution of 4.9 g. (0.02 mole) of ethyl 4H[1]benzopyrano[-d]isoxazole-3-carboxylate in 25 ml. of warm ethanol is treated with a solution of 1.5 g. of potassium hydroxide in 25 ml. of ethanol. The precipitate, which forms immediately, is washed with ethanol and dried to give the potassium salt. Treatment of the salt with dilute hydrochloric acid for 5–10 minutes on a steam bath gives the acid, 4H[1]benzopyrano[-d]isoxazole-3-carboxylic acid, m.p. 187.5°, after recrystallization from isopropanol.

Anal. Calcd. for $C_{11}H_7NO_4$: C, 60.38; H, 3.25; N, 6.45.

Found: C, 60.69; H, 3.09; N, 6.64.

EXAMPLE 4

4H[1]Benzopyrano[3,4-d]isoxazole-3-carboxamide

A solution of 83.9 g. (0.34 mole) of ethyl 4H[1]benzopyrano[-d]isoxazole-3-carboxylate in 850 ml. of warm alcohol is treated with 250 ml. of concentrated aqueous ammonia and the precipitate filtered after 2 hours to give the 4H[1]benzopyrano[3,4-d]isoxazole-3-carboxamide, m.p. 233°–236°.

Anal. Calcd. for $C_{11}H_8N_2O_3$: C, 61.11; H, 3.73; N, 12.95.

Found: C, 60.93; H, 3.95; N, 12.52.

EXAMPLE 5

4H[1]Benzopyrano[3,4-d]isoxazole-3-carbonitrile

A solution of 70.7 g. (0.327 mole) of 4H[1]benzopyrano [3,4-d]isoxazole-3-carboxamide in 650 ml. of dimethylformamide at 60° is treated dropwise over 20 minutes with 48.6 g. (0.4 mole) of thionyl chloride. The addition is slightly exothermic and is maintained at 55°–63° without external heat. After stirring 5 hours at 60° and at room temperature overnight the mixture is poured into several liters of water and the solids filtered and dried. Recrystallization from one liter of cyclohexane gives 4H[1]benzopyrano[3,4-d]isoxazole-3-carbonitrile, m.p. 127°–131°. An analytical sample prepared by recrystallization from methanol melts at 132°–134°.

Anal. Calcd. for $C_{11}H_6N_2O_2$: C, 66.66; H, 3.05; N, 14.13.

Found: C, 66.79; H, 2.96; N, 1403.

EXAMPLE 6

4H[1]Benzopyrano[3,4-d]isoxazole-3-carboxhydrazide

A stirred solution of 16.8 g. (0.069 mole) of ethyl 4H[1]benzopyrano[3,4-d]isoxazole-3-carboxylate in 250 ml. of warm ethanol is treated all at once with a solution of 27.6 g. (0.069 mole) of hydrazine hydrate in 100 ml. of ethanol. AFter heating gently on the steam bath for 30 minutes, the mixture is cooled and the solids filtered to give 4H[1]benzopyrano[3,4-d]isoxazole-3-carboxhydrazide, m.p. 197°–199°. A sample recrystallized from isopropanol melts at 195°.

Anal. Calcd. for $C_{11}H_8N_3O_3$: C, 57.14; H, 3.93; N, 18.18

Found: C, 56.83; H, 3.71; N, 18.05.

EXAMPLE 7

3-(2-Imadazolinyl)-4H[1]benzopyrano[3,4-d]isoxazole

A mixture of 4.6 g. (0.022 mole) of methyl 4H[1]benzopyrano[-d]isoxazole-3-carboximidate, 4.8 g. (0.08 mole) of ethylenediamine and 50 ml. of methanol is heated to reflux. A solution forms after 15 minutes and subsequent precipitation occurs in 1.5 hours. After 3.5 hours, the hot mixture is filtered to give 2.8 g. of the product, m.p. 209°–211°. Recrystallization from benzene and then from carbon tetrachloride gives 3-(2-imidazolinyl)-4H[1]benzopyrano[3,4-d]isoxazole, m.p. 216°–217° and a second crop, m.p. 213°–215°.

Anal. Calcd. for $C_{13}H_{11}N_3O_2$: C, 64.72; H, 4.60; N, 17.42.

Found: C, 65.18; H, 4.72; N, 17.45.

EXAMPLE 8

Methyl 4H[1]Benzopyrano[3,4-d]isoxazole-3-carboximidate

A mixture of 20.0 g. (0.11 mole) of 4H[1]benzopyrano [3,4-d]isoxazole-3-carbonitrile in 250 ml. of anhydrous methanol (distilled from Mg.) and 0.5 g. of $NaOCH_3$ is stirred magnetically in a stoppered flask. The mixture appears to thicken soon after mixing and after 1 hour thin layer chromatography (silica-ethyl acetate) indicates virtual disappearance of the nitrile. After standing overnight the solvent is removed from the reaction mixture and the residue recrystallized from 500 ml. of cyclohexane to give methyl 4H[1]benzopyrano[-d]isoxazole-3-carboximidate, m.p. 122°–124°. A sample prepared by recrystallization of the compound from isopropanol had a melting point of 124°–126°.

Anal. Calcd. for $C_{12}H_{10}N_2O_3$: C, 62.21; H, 4.38; N, 12.17.

Found: C, 62.52; H, 4.30; N, 12.20.

EXAMPLE 9

Ethyl 6-chloro-4-oxochroman-3-glyoxylate

The compound ethyl 6-chloro-4-oxochromanon-3-glyoxolate is prepared from 6-chloro-4-chromanone and diethyl oxalate by the method of Example 1.

Anal. Calcd. for $C_{13}H_{11}ClO_5$: C, 55.23; H, 3.92; Cl, 12.54.

Found: C, 55.56; H, 4.03; Cl, 12.48.

EXAMPLE 10

Ethyl 8-chloro-4H[1]benzopyrano[3,4-d]-isoxazole-3-carboxylate

A mixture of 42.0 g. (0.149 M) of glyoxylate of the preceding example, 10.4 g. (0.164 M) of hydroxylamine hydrochloride and 150 ml. of ethanol is refluxed for 21 hours and cooled to give ethyl 8-chloro-4H[1]benzopyrano[3,4-d]isoxazole-3-carboxylate as white crystals, m.p. 108°–109°. Recrystallization from cyclohexane raises the melting point to 109°–111°.

Anal. Calcd. for $C_{13}H_{10}ClNO_4$: C=55.84; H=3.60; N=5.00; Cl=12.67.

Found: C=55.78; H=3.46; N=4.89; Cl=12.64.

EXAMPLE 11

N-Methyl-8-chloro-4H[1]benzopyrano[3,4-d]isoxazole-3-carboxamide

A warm solution of 7.0 g. (0.025 mole) of ethyl 8-chloro-4H[1]benzopyrano[3,4-d]isoxazole-3-carboxylate in 150 ml. of ethanol is treated with a stream of anhydrous methylamine for 45 minutes. At this time thin layer chromatography (silica, benzene-ethyl acetate 4:1) indicates disappearance of the ester. After standing overnight at room temperature the solids present are filtered to give N-methyl-8-chloro-4H[1]benzopyrano3,4-d]isoxazole-3-carboxamide, m.p. 189°–191°. Recrystallization from 30 parts of acetonitrile gives an analytical sample, m.p. 190°–92°.

Anal. Calcd. for $C_{12}H_9ClN_2O_3$: C, 54.44; H, 3.43; Cl, 13.40; N, 10.58.

Found: C, 54.81; H, 3.59; Cl, 13.39; N, 10.35.

EXAMPLE 12

N,N-Dimethyl-8-chloro-4H[1]benzopyrano[3,4-d]isoxazole-3-carboxamide

A solution of ethyl 8-chloro-4H[1]benzopyrano[3,4-d]isoxazole-3-carboxylate (10.0 g., 0.036 mole) in 220 ml. of warm ethanol is treated with a steady stream of anhydrous dimethylamine for 2.5 hours at which time precipitation occurs. The solids are filtered and air-dried to give N,N-dimethyl-8-chloro-4H[

1]benzopyrano3,4-d]isoxazole-3-carboxamide, m.p. 175°–180°. Recrystallization from isopropanol raises the melting point to 179–181°.

Anal. Calcd. for $C_{13}H_{11}ClN_2O_3$: C, 56.02; H, 3.98; Cl, 12.72; N, 10.05.
Found: C, 56.25; H, 4.17; Cl, 12.72; N, 10.08.

EXAMPLE 13

N-Methyl-4H[1]benzopyrano[-d]isoxazole-3-carboxamide

A solution of 23.1 g. (0.1 mole) of ethyl 4H[1]benzopyrano[-d]isoxazole-3-carboxylate in 600 ml. of warm ethanol is heated with a moderate stream of methylamine for 45 minutes. Precipitation occurs after 20 minutes. The mixture is cooled, the solids filtered, and dried at 60° to give N-methyl-4H[1]benzopyrano[-d]isoxazole-3-carboxamide, m.p. 166°–169°. Concentration gives another portion, m.p. 166°–169°. A 3.0 g. portion recrystallized from 105 ml. of acetonitrile gives a purified sample, m.p. 167°–170°.

Anal. Calcd. for $C_{12}H_{10}N_2O_3$: C=62.60; H=4.37; N=12.17.
Found: C=62.40; H=4.13; N=11.65.

EXAMPLE 14

N-Methyl-4H[1]benzopyrano[-d]isoxazole-3-thiocarboxamide

A mixture of 18.3 g. (0.08 mole) of N-methyl-4H[1]benzopyrano[-d]isoxazole-3-carboxamide, 19.5 g. (0.088 mole) of $P_2S_5$ and 150 ml. of pyridine is refluxed for 1 hour, cooled, and poured cautiously on ice. The solids are filtered and air-dried to give N-methyl-4H[1]benzopyrano[-d]isoxazole-3-thiocarboxamide, m.p. 183°–185°. Recrystallization from 300 ml. of acetonitrile raises the melting point to 184°–186°. A sample for analysis is recrystallized from 50 parts of i-propanol, m.p. 185°–187°.

Anal. Calcd. for $C_{12}H_{10}N_2SO_2$: C=58.54; H=4.09; N=11.38.
Found: C=58.35; H=4.35; N=11.06.

EXAMPLE 15

Ethyl 8-Methoxy-4H[1]benzopyrano[3,4-d]isoxazole-3-carboxylate

A mixture of 47.3 g. (0.17 mole) of ethyl 6-methoxy-4-oxochroman-3-glyoxylate, 13.0 g. (0.19 mole) of hydroxylamine hydrochloride and 170 ml. of ethanol is refluxed for 1 hour, cooled in an ice bath and filtered. The solids are rinsed with ethanol to give ethyl 8-methoxy-4H[1]benzopyrano[3,4-d]isoxazole-3-carboxylate, m.p. 137°–139°.

Anal. Calcd. for $C_{14}H_{13}NO_5$: C, 61.09; H, 4.76; N, 5.09.
Found: C, 60.90; H, 4.80; N, 5.13.

EXAMPLE 16

4H[1]Benzopyrano[3,4-d]isoxazolyl-3-carbohydroxamic Acid

A solution of 2.8 g. (0.04 mole) of hydroxylamine hydrochloride in 50 ml. of methanol is mixed with a solution of 4.9 g. (0.09 mole) of NaOMe in 75 ml. of methanol. The NaCl is filtered and the filtrate added to a mixture of 6.9 g. (0.03 mole) of methyl 4H[1]benzopyrano[-d]isoxazole-3-carboxylate in 75 ml. of methanol and the mixture refluxed for 3 hours. The solids are filtered, rinsed with methanol and stirred with dilute HCl to give 4H[1]benzopyrano[3,4-d]isoxazolyl-3-carbohydroxamic acid, m.p. 108°–210°. Recrystallization from 75 parts of acetonitrile raises the melting point to 214°–216°.

Anal. Calcd. for $C_{11}H_8N_2O_4$: C=56.89; H=3.47; N=12.07.
Found: C=56.81; H=3.26; N=12.20.

EXAMPLE 17

Ethyl 6-Methoxychroman-4-one-3-glyoxylate

A mixture of 53.4 g. (0.3 mole) of 6-methoxychromanone and 43.8 g. (0.3 mole) of diethyl oxalate is added dropwise to a suspension of NaH (from 30.4 g., 0.66 mole of a 50 percent suspension in oil) in 2.25 liters of benzene containing 1 ml. of ethanol. After stirring overnight the mixture is poured, in portions, into a mixture of 100 ml. of concentrated HCl and 900 ml. of water. Stirring is continued until the red color disappears and the organic layer is a deep yellow. The layers are separated, the aqueous layer washed with benzene and the organic phases dried over $Na_2SO_4$. The solvent is removed and the residue triturated with cold n-heptane. The solids are filtered and recrystallized from 250 ml. of methylcyclohexane to give 6-methoxychroman-4-one-3-glyoxylate, m.p. 84°–86°. A sample is recrystallized from methylcyclohexane, m.p. 83.5°–85.5°.

Anal. Calcd. for $C_{14}H_{14}O_6$: C, 60.43; H, 5.07.
Found: C, 60.54; H, 4.78.

EXAMPLE 18

8-Methoxy-4H[1]benzopyrano[3,4-isoxazole-3-carboxamide

Ethyl 8-methoxy-4H[1]benzopyrano[3,4-d]-isoxazole-3-carboxylate (46 g., 0.165 mole) is added to 85 ml. of ammonia-saturated methanol followed by 85 ml. of ethylene glycol. After stirring for 24 hours, the solids are filtered, rinsed with water, methanol and then chloroform and dried to give 8-methoxy-4H[1]benzopyrano[3,4-d]-isoxazole-3-carboxamide, m.p. 241°–245°.

A sample recrystallized from 230 parts of acetonitrile had m.p. 245°–247°.

Anal. Calcd. for $C_{12}H_{10}N_2O_4$: C, 58.54; H, 4.09; N, 11.38.
Found: C, 58.68; H, 3.99; N, 11.27.

EXAMPLE 19

2-Hydroxyethyl 8-methoxy-4H[1]benzopyrano[3,4-d]isoxazole-3-carboxylate

A suspension of 26.0 g. (0.096 mole) of ethyl 8-methoxy-4H[1]benzopyrano[3,4-d]isoxazole-3-carboxylate in 130 ml. of ethylene glycol at 95° is treated with a stream of ammonia for 0.5 hours. Thin layer chromatography (silica-$CHCl_3$) indicates an absence of starting material. Water (130 ml) is added and the solids filtered and dried. By warming on the steambath with 200 ml. of acetonitrile, most of the solids are dissolved. Insoluble material (a small amount of amide) is filtered and the filtrate concentrated to 150 ml. to give 2-hydroxyethyl 8-methoxy-4H[1]benzopyrano[3,4-d]isoxazole-3-carboxylate, m.p. 130°–137°. Recrystallization from ethanol raises the melting point to 133°–135°.

Anal. Calcd. for $C_{14}H_{13}NO_6$: C, 57.73; H, 4.50; N, 4.81
Found: C, 57.83; H, 4.41; N, 4.82.

I claim:

1. A compound of the formula

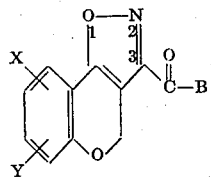

or a pharmaceutically acceptable acid addition salt thereof, in which X and Y are selected from hydrogen, halo, lower alkyl of one to four carbon atoms, lower alkoxy of one to four carbon atoms and trifluoromethyl, B is selected from

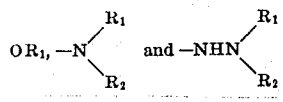

and $R_1$ and $R_2$ are selected from hydrogen, a lower alkyl of one to four carbon atoms and a phenyl-lower alkyl of seven to 13 carbon atoms.

2. A compound of claim 1 in which B is $OR_1$ and $R_1$ is hydrogen or lower alkyl of one to four carbon atoms.

3. A compound of claim 1 in which X and Y are hydrogen and B is

in which $R_1$ and $R_2$ are selected from hydrogen and lower alkyl of 1 to 4 carbon atoms.

4. The compound of claim 1 in which Y is 8-chloro, X is hydrogen and B is

5. The compound of claim 1 in which X and Y are hydrogen and B is

6. The compound of claim 1 in which X and Y are hydrogen and B is

* * * * *